United States Patent Office 3,505,014
Patented Apr. 7, 1970

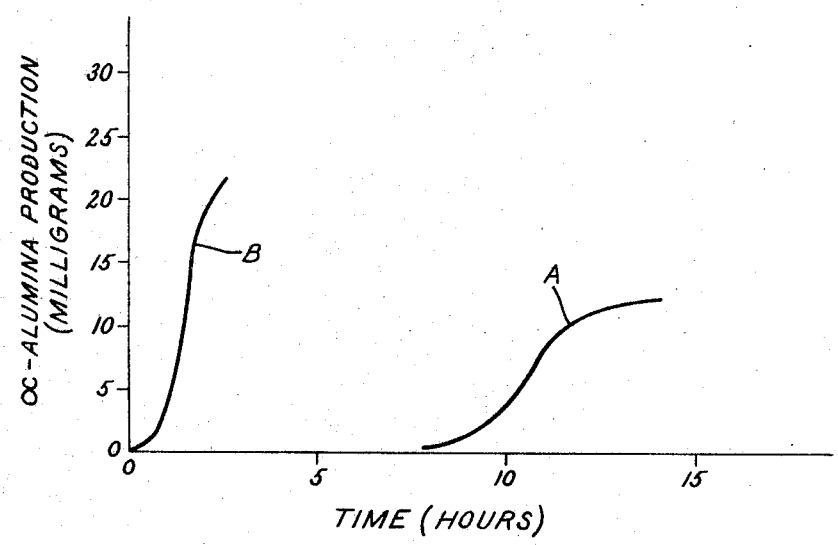

3,505,014
PROCESS FOR PRODUCING α-ALUMINA WHISKERS
Arno Gatti, Norristown, Pa., and Robert Franklin Cree, Ballston Lake, N.Y., assignors to General Electric Company, a corporation of New York
Continuation-in-part of application Ser. No. 579,259, Sept. 14, 1966. This application May 2, 1969, Ser. No. 825,113
Int. Cl. C01f 7/42
U.S. Cl. 23—142                    6 Claims

ABSTRACT OF THE DISCLOSURE

Aluminum alloyed with a non-reactive metal having a vapor pressure at 1300–1500° C. comparable to that of aluminum is used as the aluminum source in an otherwise conventional α-alumina whisker growing process. The preferred alloy is aluminum-tin with 30 to 50 atomic percent aluminum. By Raoult's law, the tin suppresses vaporization of the aluminum when the alloy is heated to 1300–1500° C. in a closed silicon-containing chamber with a hydrogen or inert gas atmosphere. As a result, the time required to produce α-alumina whiskers is significantly reduced.

CROSS REFERENCES TO RELATED APPLICATIONS

This application is a continuation-in-part of our co-pending application (now abandoned) as follows: Title, Process for Producing α-Alumina Whiskers; Ser. No. 579,259; filing date, Sept. 14, 1966.

BACKGROUND OF THE INVENTION

Field of the invention

This invention relates to α-alumina whisker production and more particularly to an improved process for producing α-alumina whiskers.

Description of the prior art

Alumina whiskers are extremely strong micro-crystals, which have an α-alumina crystalline structure. Because of the high strength and excellent high temperature stability of α-alumina, these whiskers are highly desirable as the reinforcing constituent of composite structures. However, known processes for producing α-alumina whiskers are time-consuming and inefficient in terms of the quantities of desired product and undesired by-product produced in these processes.

For example, in a typical batch process, there is a substantial delay before any alumina whiskers are produced. Thus, practically all of the desired products are produced in a fraction of the total reaction time which follows a substantial non-productive period. In addition, alumina debris, i.e. alumina in other than the α-crystalline whisker form, is produced in substantial amounts. Much effort has been expended to reduce the time necessary to produce high quality α-alumina whiskers and to reduce the concurrent production of the alumina debris by-product.

SUMMARY OF THE INVENTION

It is an object of the present invention, therefore, to provide an improved process for the production of α-alumina whiskers.

It is another object of this invention to provide a means for controlling the production of α-alumina whiskers and by-product alumina debris in an α-alumina whisker-producing process.

Still another object of this invention is to provide a process wherein α-alumina whiskers are produced more quickly and more efficiently than in those processes heretofore known.

These and other objects are met, in accordance with one aspect of the present invention, by a process in which an alloy, comprising aluminum and a metal, such as tin or manganese, having a vapor pressure at the reaction temperature comparable to that of aluminum is placed in a reaction chamber with an oxygen-containing refractory material and heated to a temperature of 1300–1500° C. In the preferred form of the present invention, an alloy comprising 30 to 50 atomic percent aluminum and remainder tin is heated, in a reaction chamber which also includes a silica refractory and a hydrogen atmosphere, to about 1350° C.

BRIEF DESCRIPTION OF THE DRAWING

The single figure represents graphically the production of whiskers as a function of time by the prior art process (curve A) and by the practice of our invention (curve B).

DESCRIPTION OF THE PREFERRED EMBODIMENT

It has been known for some time that alumina whiskers, i.e. needle-like micro-crystals of α-alumina, may be produced by reacting aluminum in a closed chamber containing an oxygen-containing refractory material, such as silica, at a temperature in the range from 1200° C. to about 1500° C. Generally, this process is carried out by placing an aluminum charge in the reaction chamber in a boat comprising pure alumina, silica, etc. Hydrogen or an inert gas is introduced into the reaction chamber and the chamber is raised to the reaction temperature. After a several hour delay, during which alumina debris is formed, measurable amounts of alumina whiskers begin to form.

Referring to the drawing, there is drawn curve A, which represents the production versus time relationship in a typical prior art process. The process comprises placing an aluminum boat containing 50 grams of aluminum in a tubular reaction chamber, having a 2½ inch inside diameter, composed of mullite. The chamber may also be composed of some other oxygen-containing refractory material or a non-reactive material with an oxygen-containing refractory liner. Silica is the preferred oxygen-containing refractory used for this purpose. Silica-containing minerals, such as mullite, have been found to be particularly effective. In carrying out this process, the reaction chamber is closed and hydrogen or inert gas is introduced into the chamber at ambient pressure or slightly above. The chamber is then heated to a temperature in the range 1300 to 1500° C. It will be noted, from curve A, that in a 15-hour reaction period in processes of this type, roughly the first 10 hours is a non-productive delay period. During this delay period, aluminum debris is formed. It is now thought that this delay period is caused by an excessive amount of aluminum vapor present in the reaction space. Thus alumina debris, which forms on the surface of the aluminum during the delay period, suppresses aluminum vaporization. When sufficient debris has been formed to reduce the aluminum vapor content in the reaction space to a level advantageous for α-alumina whisker production, the productive period of the overall reaction time occurs.

Although not shown in the drawing, the rate of α-alumina whisker production begins to drop significantly after about 15 hours. This is attributed to a choking effect caused by excessive debris which reduces the aluminum vapor content below the level needed to support the α-alumina whisker reaction.

In accordance with the present invention, this process is improved by the use of an aluminum source comprising an alloy of aluminum with another metal, which alloy is a single phase liquid at the reaction temperature.

Further the metal with which aluminum is alloyed must not interfere with the desired reaction and must have a vapor pressure at the temperature of the reaction sufficient to suppress, to a limited degree, aluminum vaporization. It will be recognized that this aluminum vapor suppression effect is an application of Raoult's law. The effective proportions which may be used with any given alloying element may require experimental determination. Metals having a vapor pressure, at the reaction temperature of the present process, substantially below that of aluminum are unlikely to be practical in this application since much greater proportions of such a metal would be required in the aluminum alloy to be effective. On the other hand, metals with a vapor pressure substantially greater than that of aluminum would be impractical because their vapor pressures would be balanced with that of aluminum only at very low concentrations. At such concentrations, the alloying metal is not likely to be effective in suppressing aluminum vaporization. Generally, for effective but not excessive vapor pressure suppression of aluminum, the alloying metal's vapor pressure at any temperature in the temperature range of interest, namely 1300–1500° C. should be neither less than one tenth of nor more than ten times that of aluminum at the same temperature.

In order that the alloying metal not interfere chemically with the aluminum-silica reaction, the free energy of formation of the oxide of the alloying metal in a hydrogen atmosphere at the temperature of the reaction must be positive.

Two metals which meet all of the foregoing requirements are tin and manganese. Because the vapor pressure of manganese matches that of aluminum so closely in the range 1300–1500° C., an alloy comprised of 50 atomic percent manganese, remainder aluminum is suggested if manganese is used. However, for other reasons such as availability and the tendency of aluminum-manganese to form immiscible phases near the reaction temperature range, tin is the preferred alloying element.

Referring specifically to the preferred alloy, i.e., aluminum-tin, it has been found that a proportion of from 30 to 50 atomic percent of aluminum will be effective in the present process. Using such alloys as the aluminum source in an α-alumina whisker-producing process, one may observe that significant production of α-alumina whiskers begins to occur within the first few minutes of the process.

For example, curve B in the drawing, represents the production versus time relationship for a process identical to that represented by curve A except that the charge comprised 50 grams of an alloy of 30 atomic percent aluminum with 70 atomic percent tin rather than 50 grams of pure aluminum. This test was conducted at a reaction temperature of 1350° C., which is the preferred temperature for this reaction. As may be noted from the curve, the improved process of this invention results in whisker production after only a very short time and the extended delay observed when pure aluminum is used as the aluminum source is eliminated. A concurrent and equally beneficial result of this improvement, however, is that a considerable amount of debris formation is avoided by the elimination of this delay. Therefore, the process of the present invention not only provides a quicker α-alumina whisker-producing method, but in addition provides a more efficient process with regard to the use of aluminum. Thus, the proportion of aluminum converted to desired product, i.e. α-alumina whiskers, is substantially increased and that converted to by-product, i.e. alumina debris, is substantially reduced, in the present invention.

We claim:
1. In the process for producing α-alumina whiskers consisting of heating aluminum and silica in an atmosphere of hydrogen or an inert gas to a temperature of 1300–1500° C., the improvement comprising providing as the source of said aluminum, an alloy of aluminum with tin or manganese.

2. An improved process, as recited in claim 1, wherein said alloy is an aluminum-tin alloy.

3. An improved process, as recited in claim 2, wherein said alloy comprises 30 to 50 atomic percent aluminum.

4. An improved process, as recited in claim 3, wherein said alloy comprises 30 atomic percent aluminum.

5. An improved process, as recited in claim 1, wherein said alloy is an aluminum-manganese alloy.

6. An improved process, as recited in claim 5, wherein said alloy comprises 50 atomic percent aluminum and 50 atomic percent manganese.

References Cited

UNITED STATES PATENTS

| | | | |
|---|---|---|---|
| 3,011,870 | 12/1961 | Webb et al. | 23—142 |
| 3,077,380 | 2/1963 | Wainer et al. | 23—142 |
| 3,240,560 | 3/1966 | Spear | 23—142 |
| 3,421,851 | 1/1969 | Shyne et al. | 23—142 |

FOREIGN PATENTS 608,032  11/1960  Canada.

OSCAR R. VERTIZ, Primary Examiner

T. OZAKI, Assistant Examiner